United States Patent [19]
Burk et al.

[11] Patent Number: 5,281,650
[45] Date of Patent: Jan. 25, 1994

[54] PROCESS FOR PREPARING SINTERED SHAPED AND ARTICLES SO PREPARED THEREBY

[75] Inventors: W. Michael Burk, Chardon; Robert E. Quinn, Cleveland, both of Ohio

[73] Assignee: The Lubrizol Corporation, Wickliffe, Ohio

[21] Appl. No.: 796,150

[22] Filed: Nov. 22, 1991

[51] Int. Cl.$^5$ .................. C08J 5/10; C08K 3/18; C08K 3/22; C08L 81/00
[52] U.S. Cl. .................. 524/430; 524/445; 524/547; 524/609; 524/650; 524/723; 524/743; 524/745; 526/287; 526/288
[58] Field of Search .............. 524/430, 650, 745, 743, 524/609, 723, 445, 547; 526/287, 288

[56] References Cited

U.S. PATENT DOCUMENTS 4,509,987 4/1985 Farrar et al. .................. 106/308 Q
4,836,966 6/1989 Shimuzu et al. .................. 264/63

FOREIGN PATENT DOCUMENTS 0205744 12/1986 European Pat. Off. .

OTHER PUBLICATIONS

Lubrizol AMPS Monomer brochure.
Dispersions of Ceramic Powders in Organic Media, Advances in Ceramics vol. 21: Ceramic Powder Science Copyright 1987, The American Ceramic Society, Inc. pp. 411-415.
Dispersants in Ceramics Processing British Ceramics Proceedings Published by British Ceramics Society, vol. 37 (1986) pp. 249-253.
Tape Casting: The Basic Process for Meeting the Needs of the Electronics Industry, Ceramic Bulletin, vol. 69, No. 6, 1990, pp. 1022-1026, by R. Mistler.

*Primary Examiner*—Paul R. Michl
*Assistant Examiner*—U. K. Rajguru
*Attorney, Agent, or Firm*—Forrest L. Collins

[57] ABSTRACT

The invention relates to a method of preparing sintered shapes, comprising the steps of: (1) forming a green body from a mixture comprising (A) at least one inorganic powder with (B) at least one polymer derived from (a) at least two sulfo monomers or (b) a combination of (i) a sulfo monomer with (ii) at least one monomer selected from acrylic compounds, acrylonitriles, vinyl lactams and vinyl pyrrolidones and maleic acids, anhydrides or salts, provided the mixture is substantially free of polysaccharide; (2) sintering the body. Inorganic shapes made from the compositions of the present invention have relatively high fired densities; small uniform grain sizes; and relatively low porosity. The sulfo polymers of the present invention help disperse the inorganic powder. These polymers improve deagglomeration of the inorganic powder and also help prevent reagglomeration of the powder. The polymers provide divalent ion stability for systems using water containing divalent ions, such as hard water. These polymers help reduce viscosity of inorganic powder slurries and improve defloculation of the inorganic powder.

29 Claims, No Drawings

PROCESS FOR PREPARING SINTERED SHAPED AND ARTICLES SO PREPARED THEREBY

TECHNICAL FIELD

This invention relates to methods for preparing sintered articles.

INTRODUCTION TO THE INVENTION

The manufacture of sintered shapes frequently involves the use of additives for controlling the powder/slurry dispersion, green compaction, density and grain size of the final shape. The objective generally is to achieve the highest possible density with a uniform, small grain size, high strength, high thermal conductivity and in the area of electronics, to achieve beneficial dielectric properties, including smooth and ultrasmooth surfaces.

Many processes for preparing green inorganic shapes involve the preparation and use of inorganic slurries prepared by dispersing inorganic powders in liquids including, depending upon the application, water or organic liquids such as xylene, toluene, etc. The slurries of inorganic powders usually are prepared by milling a mixture containing the inorganic materials and the liquid. To improve the dispersion of the solids, maximize the solids concentration in the slurry and minimize slurry viscosity, dispersants have been added to obtain a complete dispersion of the powders in the liquid.

European Patent Application 205,744 relates to high-solid slurry stabilizers which are comprised of an acid-sensitive cross-linked polysaccharide and a water-soluble polymer having repeating units derived from an acrylamido alkane sulfonic acid or the ammonium salt thereof.

SUMMARY OF THE INVENTION

The invention relates to a method of preparing sintered shapes, comprising the steps of: (1) forming a green body from a mixture comprising (A) at least one inorganic powder with (B) at least one polymer derived from (a) at least two sulfo monomers or (b) a combination of (i) a sulfo monomer and (ii) at least one comonomer selected from the group consisting of acrylic compounds; maleic acids, anhydrides or salts; vinyl lactams; vinyl pyrrolidones; and fumaric acids or salts, (2) sintering the body. Inorganic shapes made from the compositions of the present invention have relatively high fired densities, small uniform grain sizes, and low porosity. The sulfo polymers of the present invention help disperse the inorganic powder. These polymers improve deagglomeration of the inorganic powder and help prevent reagglomeration of the powder. The polymers provide divalent ion stability for systems using water containing divalent ions, such as hard water. These polymers help reduce viscosity of inorganic powder slurries and improve defloculation of the inorganic powder. The sulfo polymers also act as binders and lubricants (such as die lubricants).

DESCRIPTION OF THE PREFERRED EMBODIMENTS

The term "hydrocarbyl" includes hydrocarbon, as well as substantially hydrocarbon, groups. Substantially hydrocarbon describes groups which contain non-hydrocarbon substituents which do not alter the predominately hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkylmer-capto, nitro, nitroso, sulfoxy, etc.);

(3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about two, preferably no more than one, non-hydrocarbon substituent will be present for every ten carbon atoms in the hydrocarbyl group. Typically, there will be no such non-hydrocarbon substituents in the hydrocarbyl group. Therefore, the hydrocarbyl group is purely hydrocarbon. cl (A) Inorganic Powders Inorganic powders (A) used from the present invention include metallic and non-metallic powders. Powders may also be oxides or non-oxides of metallic or non-metallic elements. An example of metallic elements which may be present in the inorganic powders include calcium, magnesium, barium, scandium, titanium, vanadium, chromium, manganese, iron, cobalt, nickel, copper, zinc, yttrium, niobium, molybdenum, ruthenium, rhodium, silver, cadmium, lanthanum, actinium, gold or combinations of two or more thereof. In one embodiment, the inorganic powder may contain rare earth or ferromagnetic elements. The rare earth elements include the lanthanide elements having atomic numbers from 57 to 71, inclusive and the element yttrium, atomic number 39. Ferromagnetic metals, for purposes of this invention, include iron, nickel, cobalt and numerous alloys containing one or more of these metals. In another embodiment, the metals are present as alloys of two or more of the aforementioned elements. In particular, prealloyed powders such as low alloy steel, bronze, brass and stainless steel as well as nickel-cobalt based super alloys may be used as inorganic powders.

The inorganic powders (A) may comprise inorganic compounds of one or more of the above-described metals. The inorganic compounds include ferrites, titanates, nitrides, carbides, borides, fluorides, sulfides, hydroxides and oxides of the above elements. Specific examples of the oxide powders include, in addition to the oxides of the above-identified metals, compounds such as beryllium oxide, magnesium oxide, calcium oxide, strontium oxide, barium oxide, lanthanum oxide, gallium oxide, indium oxide, selenium oxide, etc. Specific examples of oxides containing more than one metal, generally called double oxides, include perovskite-type oxides such as $NaNbO_3$, $SrZrO_3$, $PbZrO_3$, $SrTiO_3$, $BaZrO_3$, $BaTiO_3$; spinel-type oxides such as $MgAl_2O_4$, $ZnAl_2O_4$, $CoAl_2O_4$, $NiAl_2O_4$, $NiCr_2O_4$, $FeCr_2O_4$, $MgFe_2O_4$, $ZnFe_2O_4$, etc.; illmenite-types oxides such as $MgTiO_3$, $MnTiO_3$, $FeTiO_3$, $CoTiO_3$, $ZnTiO_3$, $LiTaO_3$, etc.; and garnet-type oxides such as $Gd_3Ga_5O_{12}$ and rare earth-iron garnet represented by $Y_3Fe_5O_{12}$.

An example of non-oxide powders include carbides, nitrides, borides and sulfides of the metals described above. Specific examples of the carbides include SiC, TiC, WC, TaC, HfC, ZrC, AlC; examples of nitrides include $Si_3N_4$, AlN, BN and $Ti_3N_4$; and borides include $TiB_2$, $ZrB_2$ and $LaB_6$.

The inorganic powder (A) may also be a clay. Examples of clays include kaolinite, nacrite, dickite, montmorillonite, nontronite, saponite, hectorite, etc.

In one embodiment, the inorganic powder is silicon nitride, silicon carbide, zirconia, alumina, aluminum nitride, barium ferrite, barium-strontium ferrite or copper oxide. In another embodiment, the inorganic powder is alumina or a clay.

(B) Sulfo Polymers

Polymers useful in the present invention are derived from (a) at least two sulfo monomers or (b) a combination of (i) at least one sulfo monomer and (ii) at least one comonomer selected from the group consisting of acrylic compounds; maleic acids, anhydrides or salts; vinyl lactams; vinyl pyrrolidones; and fumaric acids or salts. The polymers are generally present in an amount from about 0.001%, generally about 0.1%, preferably 0.5%, more preferably about 1%, to about 30%, generally to about 15%, preferably to about 10%, more preferably to about 2%, wherein all percentages are based on the weight of the inorganic powder (A). Polymers derived from sulfo monomers are useful as dispersants, binders and/or lubricants in ceramic processing.

Sulfo monomers are monomers which contain at least one sulfonic or sulfinic acid, or salt thereof. A mixture of sulfo monomer acids and salts may be used. Preferably, the sulfo monomer contains a sulfonic acid or salt thereof.

Sulfo monomers useful in the present invention include vinyl alkyl sulfo, vinyl aromatic sulfo or acrylamido-hydrocarbyl sulfo monomers. Examples of useful sulfo monomers include vinyl sulfonic acid, vinyl naphthalene sulfonic acid, vinyl anthracene sulfonic acid, vinyl toluene sulfonic acid, methallyl sulfonic acid (2-methyl-2-propene-1-sulfonic acid) and acrylamidohydrocarbyl sulfonic acid, or salts of any of these acids A particularly useful acrylamidohydrocarbyl sulfo monomer is 2-acrylamido-2-methylpropane sulfonic acid or salts thereof. This compound is available from The Lubrizol Corporation, Wickliffe, Ohio, USA, under the trademark AMPS ® Monomer. Other useful acrylamidohydrocarbyl sulfo monomers include 2-acrylamidoethane sulfonic acid, 2-acryl-amidopropane sulfonic acid, 3-methylacrylamidopropane sulfonic acid, and 1,1-bis(acrylamido)-2-methylpropane-2-sulfonic acid, or salts thereof.

In an embodiment, the sulfo monomer may be represented by the formula

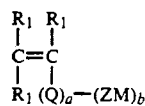

(I)

wherein each $R_1$ is independently hydrogen or a hydrocarbyl group; a is 0 or 1, preferably 1; b is 1 or 2, preferably 1, provided that when a is 0, then b is 1;

Q is a divalent or trivalent hydrocarbyl group or $C(X)NR_2Q'$;

each $R_2$ is independently hydrogen or a hydrocarbyl group;

Q' is a divalent or trivalent hydrocarbyl group;

X is oxygen or sulfur, preferably oxygen;

Z is S(O)O, or $S(O)_2O$, preferably $S(O)_2O$; and

M is hydrogen, a metal cation or ammonium cation.

In Formula I, $R_1$ and $R_2$ are each independently hydrogen or hydrocarbyl. In a preferred embodiment, $R_1$ and $R_2$ are each independently hydrogen or an alkyl group having from 1 to 12 carbon atoms, preferably to about 6, more preferably to about 4. In a preferred embodiment, $R_1$ and $R_2$ are each independently hydrogen or methyl, preferably hydrogen.

Q is a divalent or trivalent hydrocarbyl group or $C(X)NR_2Q'$. Q' is a divalent or trivalent hydrocarbyl group. For Q and Q', the divalent or trivalent hydrocarbyl groups include alkanediyl (alkylene), alkanetriyl, arenylene (arylene) and arenetriyl. Preferably, Q is an alkylene group, an arylene group or $C(X)(NR_2)Q'$. For Q and Q', the hydrocarbyl groups each independently contain from 1, preferably about 3 to about 18 carbon atoms, preferably to about 12, more preferably to about 6, except when Q or Q' are aromatic where they contain from 6 to about 18 carbon atoms, preferably to about 12. Examples of di- or trivalent hydrocarbyl groups include di- or trivalent methyl, ethyl, propyl, butyl, cyclopentyl, cyclohexyl, hexyl, octyl, 2-ethylhexyl, decyl, benzyl, tolyl, naphthyl, dimethylethyl, diethylethyl, and butylpropylethyl groups, preferably a dimethylethyl group.

In a preferred embodiment, Q is $C(X)NR_2Q'$ and Q' is an alkylene having from about 4 to about 8 carbon atoms, such as dimethylethylene.

In one embodiment, the polymer is derived from at least one sulfo monomer represented by Formula I.

The polymers derived from the sulfo monomers generally are characterized as having sulfonic or sulfinic acid moieties extending from the backbone of the polymer. The polymers may be used in acidic form or may be used in salt. The polymers may also contain two or more sulfo-acid, or sulfo-salt moieties. When used in salt form, the polymers generally contain a sulfo-ammonium salt, a sulfo-metal salt or mixtures thereof. Sulfoammonium salts refer to ammonium salts of the sulfonic or sulfinic acid moieties of the polymer.

The sulfo-ammonium salts useful in the present invention may be formed from ammonia, a monoamine or a polyamine. The monoamines generally contain from 1 to about 24 carbon atoms, preferably from 1 to about 12, and more preferably from 1 to about 6. Examples of monoamines useful in the present invention include methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc. Tertiary amines include trimethylamine, tributylamine, methyldiethylamine, ethyldibutylamine, etc.

In another embodiment the monoamines are hydroxyamines. Typically, the hydroxyamines are primary, secondary or tertiary alkanol amines or mixtures thereof. Such amines can be represented by the formulae:

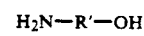

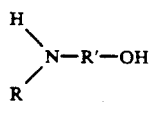

and

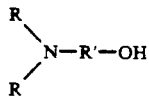

wherein each R is independently a hydrocarbyl group of one to about eight carbon atoms or hydroxyhydrocarbyl group of one to about eight carbon atoms and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadeoylene, etc. group. Where two R groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each R is a lower alkyl group of up to seven carbon atoms. Examples of hydroxyamines include monoethanolamine, diethanolamine, triethanolamine, diethylethanolamine, dimethylmethanol- amine, ethylethanolamine and aminomethylpropanol. Preferably, the hydroxyamine is amino methylpropanol.

The hydroxyamines can also be an ether N-(hydroxyhydrocarbyl)amine. These are hydroxypoly(hydrocarbyloxy) analogs of the above-described hydroxy amines (these analogs also include hydroxyl-substituted oxyalkylene analogs). Such N-(hydroxyhydrocarbyl) amines can be conveniently prepared by reaction of epoxides with aforedescribed amines and can be represented by one of the formulae:

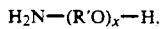

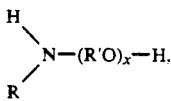

or

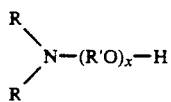

wherein x is a number from about 2 to about 15 and R and R' are as described above. R may also be a hydroxypoly(hydro-carbyloxy) group.

The polyamines may be aliphatic, cycloaliphatic, heterocyclic or aromatic. Examples of the polyamines include alkylene polyamines and heterocyclic polyamines. Preferably, the polyamines contain only one —NH— group. The use of polyamines containing only one —NH— group eliminates the problems caused by cross-linking of multi-functional polyamines. When using multi-functional polyamines, care must be taken to control cross-linking and subsequent formation of sludge.

Alkylenepolyamines are represented by the formula

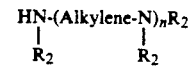

wherein n has an average value between about 1 and about 10, preferably about 2 to about 7 and the "Alkylene" group has from 1 to about 10 carbon atoms, preferably about 2 to about 6 carbon atoms. $R_2$ is independently preferably hydrogen; or an aliphatic or hydroxy-substituted aliphatic group of to about 30 carbon atoms.

Such alkylene polyamines include methylene-polyamines, ethylenepolyamines, propylenepolyamines, butylenepolyamines, pentylenepolyamines, etc. The higher homologs and related heterocyclic amines such as piperazines and N-amino alkyl-substituted piperazines are also included. Specific examples of such polyamines are ethylene-diamine, triethylenetetramine, tris-(2aminoethyl)amine, propylenediamine, trimethylenediamine, tripropylenetetramine, tetraethylenepentamine, hexaethyleneheptamine, pentaethylenehexamine, etc.

Higher homologs obtained by condensing two or more of the above-noted alkylene amines are similarly useful as are mixtures of two or more of the aforedescribed polyamines.

Ethylenepolyamines, such as some of those mentioned above, are useful. Such polyamines are described in detail under the heading Ethyleneamines in Kirk Othmer's "Encyclopedia of Chemical Technology", 2d Edition, Vol. 7, pages 22-37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylenepolyamines including cyclic condensation products such as the aforedescribed piperazines. Ethylenepolyamine mixtures are useful.

Polyamine analogs of the hydroxy monoamines, particularly alkoxylated alkylenepolyamines (e.g., N,N-(diethanol)-ethylenediamine) can also be used. Such polyamines can be made by reacting alkyleneamines (e.g., ethylenediamine) with one or more alkylene oxides (e.g., ethylene oxide, octadecene oxide) of two to about 20 carbons. Similar alkylene oxide-alkanol amine reaction products can also be used such as the products made by reacting the aforedescribed primary, secondary or tertiary alkanol amines with ethylene, propylene or higher epoxides in a 1.1 to 1.2 molar ratio. Reactant ratios and temperatures for carrying out such reactions are known to those skilled in the art.

Specific examples of alkoxylated alkylene polyamines include N-(2-hydroxyethyl) ethylenediamine, N,N-bis(2-hydroxyethyl)-ethylenediamine, 1-(2-hydroxyethyl)-piperazine, mono(hydroxypropyl)-substituted tetraethylene-pentamine, N-(3-hydroxybutyl)-tetramethylenediamine, etc. Higher homologs obtained by condensation of the above-illustrated hydroxy alkylenepolyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforementioned polyamines are also useful.

Among the heterocyclic polyamines are aziridines, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-amino-alkylthiomorpholines, N-aminoalkylpiperazines, N,N'-di-aminoalkylpiperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkylsubstituted piperidines, piperazine, aminoalkyl-substituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-diaminoethylpiperazine.

Hydroxy heterocyclic polyamines are also useful. Examples include N-(2-hydroxyethyl)cyclohexylamine, 3-hydroxycyclopentylamine, parahydroxyaniline, N-hydroxyethylpiperazine, and the like.

The sulfo-ammonium salts are obtained from a sulfo acid and ammonia or an amine. The reaction occurs at a temperature between about 30° C. to about 110° C., with about 30° C. to about 80° C. preferred.

The sulfo-metal salts may be prepared by the reaction of the sulfo acids with an alkali, an alkaline earth, or a transition metal. The reaction usually occurs at a temperature of from about 0° C. to about 125° C., with about 20° C. to about 100° C. being preferred. The sulfo acid is reacted with the metal compound in roughly stoichiometric amounts. A slight excess of metal containing compound may be used.

The polymers, useful in the present invention, include interpolymers, such as co- and terpolymers. Generally, the polymers are prepared from (a) at least two sulfo monomers or (b) a combination of (i) at least one sulfo monomer and (ii) one or more comonomers selected from the group consisting of acrylic compounds; maleic acids, anhydrides or salts; vinyl lactams; vinyl pyrrolidones and fumaric acids or salts. In one embodiment, the comonomer is water soluble. Acrylic compounds include acrylamides, acrylonitriles, acrylic acids, esters or salts, methacrylic acids, esters or salts, and the like. Specific examples of these compounds include acrylamide, methacrylamide, methylenebis(acrylamide), hydroxymethylacrylamide, acrylic acid, methacrylic acid, methylacrylate, ethylacrylate, butylacrylate, 2-ethylhexylacrylate, hydroxyethylacrylate, hydroxybutylacrylate, methylacrylate, ethylacrylate, butylmethylacrylate, hydroxypropylmethacrylate, crotonic acid, methyl crotonate, butyl crotonate, hydroxyethyl crotonate. Alkali or alkaline earth metal (preferably sodium, potassium, calcium or magnesium) or ammonium salts of acrylic, methacrylic or crotonic acids may also be used. Substituted and unsubstituted vinyl pyrrolidones and vinyl lactams, such as vinyl caprolactam, are useful as comonomers. Examples of useful maleic comonomers include alkali or alkaline earth metal or ammonium salts of maleic acid (preferably sodium salts), $C_{1-6}$ alkyl esters (preferably methyl, ethyl or butyl), or ester-salts formed from $C_{1-6}$ alkyl esters and alkali or alkaline earth metal compounds or ammonia or amines. Preferably, the monomers include acrylic or methacrylic acids, esters or salts.

The interpolymers of the present invention generally contain from about 5 to about 95 mole percent of the sulfo monomer, and from 5 to about 95 mole percent of the comonomer. In one embodiment, sulfo monomers is present in an amount from about 10, preferably about 15, more preferably about 20 to 95, preferably 75, preferably 65, more preferably 55 mole percent. In this embodiment, the comonomer is generally present in an amount from about 10, preferably about 25, more preferably about 35, more preferably about 45 up to 90, preferably 85, more preferably about 80 mole percent.

The polymers are formed by polymerization of the sulfo monomers using conventional vinyl polymerization techniques. For solution polymerization, water is the preferred solvent for the preparation of the polymers of the present invention. Dimethylformamide is also suitable in many cases. Initiators used in the polymerization process are known to those in the art and include ammonium persulfate, hydrogen peroxide, redox initiators and organic soluble initiators such as azo-bis-isobutyronitrile.

The polymers may also be prepared in a high energy mechanical mixing means, such as an extruder or ball mill. The process using a high energy mechanical mixing means is described in U.S. Pat. No. 4,812,544 issued to Sopko et al. The process described therein is hereby incorporated by reference for its disclosure to making of polymers and copolymers with high energy mechanical mixing.

The sulfo polymers used in the present invention generally have a viscosity average molecular weight to about 9,000,000, preferably to about 6,000,000, preferably to about 3,000,000, more preferably to about 1,000,000. The polymers generally have viscosity average molecular weight of at least about 5,000, preferably about 10,000. In one embodiment, the sulfo polymers have a viscosity average molecular weight of at least about 75,000, preferably at least about 100,000, more preferably at least about 1,000,000.

In another embodiment, the polymers generally have a viscosity average molecular weight below about 1,000,000, preferably below about 500,000, more preferably below about 100,000 and often even below about 50,000. The polymers generally have a viscosity average molecular weight of above about 5,000, preferably above about 10,000. The polymers having molecular weights below 1,000,000 decrease the viscosity of the systems of the present invention without increasing viscosity due to thickening by the polymer. The polymers in this embodiment typically have an inherent viscosity from about 0.02 deciliter per gram ($dLg^{-1}$), preferably from about 0.075 $dLg^{-1}$, more preferably from about 0.1 $dLg^{-1}$ to about 0.5 $dLg^{-1}$, preferably to about 0.25 $dLg^{-1}$, more preferably to about 0.2 $dLg^{-1}$. The inherent viscosity is determined on solutions of 0.1 part of sample in 100 parts of 0.5 normal aqueous sodium chloride solution at 30° C.

The following examples relate to polymers useful in the present invention. In the examples, and elsewhere in the specification and claims, temperature is degrees Celsius, parts are parts by weight, and pressure is atmospheric.

EXAMPLE 1

A monomer solution is prepared by adding 81.8 parts, 0.40 mole, of 2-acrylamido-2-methylpropane sulfonic acid to 492.8 parts of distilled water. The mixture is stirred and then 144 parts (1.53 moles) of 2-amino-2-methyl- 1-propanol is added to the mixture. The reaction temperature is kept below 30° C. The pH of the solution is 10.6. Acrylic acid (81.8 parts, 1.13 moles) is added to the mixture and the final pH is 8.9.

The monomer solution is added to a reaction vessel and heated to 60° C. under nitrogen. At 60° C., 0.47 part, 0.021 mole, of ammonium persulfate dissolved in 50 grams of distilled water and 0.35 part, 0.018 mole, of sodium metabisulfite dissolved in 50 parts of water are added separately over 15 minutes to the reaction mixture. The reaction temperature is increased to reflux and remains at reflux for 30 minutes. The temperature is reduced to room temperature. The product is an aqueous solution containing 30% polymer. The dried polymer has an inherent viscosity of 0.08 $dLg^{-1}$ (0.25 parts polymer in 100 parts of 0.5 normal sodium chloride solution at 30° C.).

EXAMPLE 2

A monomer solution is prepared by mixing 494 parts of distilled water with 138 parts (0.67 mole) of 2-acrylamido-2-methylpropane sulfonic acid. 2-Amino-2-methyl-1propanol (122 parts, 1.3 moles) is added to the mixture and the reaction temperature is maintained below 30° C. Acrylic Acid (46.0 parts, 0.64 moles) is added to the mixture. The pH of the solution is 8.7. A reaction vessel is charged with the above monomer solution. The solution is heated to 60° C. under nitrogen where 0.4 part, 0.0175 mole, of ammonium persulfate in 50 parts of water and 0.3 part, 0.00158 mole, of sodium metabisulfite in 50 grams of water are added to the monomer solution over 15 minutes. The temperature of the reaction is maintained at reflux for 30 minutes. The reaction temperature is reduced to room temperature. The product is an aqueous solution containing 31% by weight polymer. The dried polymer has an inherent viscosity of 0.12 $dLg^{-1}$ (0.25 parts polymer in 100 parts 0.5 normal sodium chloride solution at 30° C.).

EXAMPLE 3

A monomer solution is prepared by disolving 701 part of sodium hydroxide in 13,255 parts of distilled water. Methacrylic acid (1,492 parts) is added to the mixture. The pH of the mixture is adjusted to 7 with 3,233 parts of a 58% by weight aqueous solution of 2-acrylamido-2-methylpropane sulfonic acid sodium salt. The mixture is purged with nitrogen and heated to 60° C. Ammonium persulfate (17.43 parts disolved in 70 parts of water) is added in one portion. The reaction temperature is maintained at 60° –62° C. for 6 hours. The reaction mixture is cooled to room temperature. The product is an aqueous solution of a copolymer of sodium methacrylate and sodium 2-acrylamino-2-methylpropane sulfonate.

EXAMPLE 4

A solution is prepared by disolving27.8 parts of sodium hydroxide in 958 parts of water. Acrylic acid (50 parts) is added with stirring at 25° C. To the mixture is added 525 parts of a 50% by weight aqueous solution of acrylamide. To this mixture is added 189 parts of a 58% by weight aqueous solution of 2-acrylamido-2-methylpropane sulfonic acid sodium salts. The mixture is stirred, the pH is adjusted to 8.0 to 8.5 with 50% sulfuric acid. The mixture is purged with nitrogen. To the mixture is added 1 millileter of 0.1M aqueous solution of EDTA and 1.2 millileters of 0.2M aqueous solution of ammonium persulfate. The reaction mixture is heated to 50° C. where the reaction is exothermic. The reaction temperature is increased to 68° C. and held for 2 hours. The reaction mixture is cooled to room temperature and the product is an aqueous solution of a terpolymer of 2-acrylamido-2-methylpropane sulfonic acid sodium salt, acrylamide and sodium methacrylate.

EXAMPLE 5

A monomer solution is prepared by mixing 43 parts (0.44 mole) of maleic anhydride with 666.5 parts (0.44 mole) of a 15% by weight solution of sodium 2-acrylamido-2-methylpropane sulfonate in dimethylformamide. The above monomer solution is added to a reaction vessel and heated to 60° C. under nitrogen. The reaction temperature is maintained at 60° –63° C. for 45 minutes where 0.6 part (0.004 mole) of azobis(isobutyronitrile) dissolved in 2.6 parts dimethylformamide is added to the reaction vessel. The reaction temperature is maintained at 60° C. for 19 hours. The reaction temperature was reduced to room temperature. The solution is a clear orange liquid. The liquid was stripped on a rotary evaporator at 80° C. and ten millimeters of mercury. The residue was added to a beaker containine 1500 millileters of chloroform and stirred for 20 minutes. The polymer percipitates and is collected on a Buchner funnel, using #1 filter paper. The solid was dried over night at room temperature and then placed in a vacuum oven at room temperature for 20 hours. The resulting cake was broken up and dried for 24 hours at 50° C. under vacuum of 30 millimeters of mercury. The product is a tan solid which is a copolymer of sodium 2-acrylamido-2-methylpropane sulfonate and sodium maleate. The product has an inherent viscosity of 0.039 $dLg^{-1}$ (0.25 part polymer in 100 parts 0.5 normal aqueous sodium chloride at 30° C.).

EXAMPLE 6

A reaction vessel is charged with 67.7 parts 0.94 mole) of acrylic acid and 651 parts of dimethylformamide. Anhydrous sodium carbonate (49.8 parts, 0.47 mole) is added to the flask at 27° C. The slurry is stirred for 36 minutes at 25° C. The reaction temperature is increased to 40° C. and the mixture is stirred for three hours. A solution of 67.5 parts (0.69 mole) of maleic anhydride, 50 parts (0.065 mole) of a 30% solution of sodium 2-acrylamido-2-methylpropane sulfonate in dimethylformamide, and 75 parts dimethylformamide is added to the reaction vessel at 27° C. The reaction mixture is heated to 35° C. for 20 minutes. A solution of 0.5 parts of azobis(isobutyronitrile) in 3 parts dimethylformamide is added to the reaction vessel at 45° C. The reaction temperature increases exothermically to 70° C. over 20 minutes. The reaction temperature is maintained between 60° –63° C. for two hours. The reaction temperature is decreased to room temperature. The reaction mixture is filtered through a Buchner funnel using #1 filter paper. The filtrate is stripped at 80° C. and ten millimeters of mercury, and the residue is a viscous syrup. The residue is added to a beaker containing 1500 millileters of chloroform to give a brown solid which is collected on a Buchner funnel using #1 filter paper. The solid is vacuum dried for 24 hours at 60° C. and 30 millimeters of mercury. The product is a terpolymer of sodium 2-acrylamido-2-methylpropane sulfonate, sodium acrylate, and sodium maleate. The residue has an inherent viscosity of 0.12 dLg$^{-1}$ (0.1077 part product in 100 parts 0.5 normal aqueous sodium chloride solution at 30° C.).

EXAMPLE 7

A copolymer of 50 parts sodium 2-acrylamido-2-methylpropane sulfonate and 50 parts sodium vinyl sulfonate is prepared by the procedure described in Example 1.

EXAMPLE 8

A copolymer of 75 parts of sodium 2-acrylamido-2-methylpropane sulfonate in 25 parts sodium allyl sulfonate is prepared by the procedure described in Example 1.

Organic Binder

Binders may be included in the compositions to facilitate the production of sintered shapes whether the shapes are produced by extrusion or injection molding, press molding or slip casting or other methods.

The amount of binder included in the compositions of the present invention is an amount which provides the desired properties for the green and sintered shapes. Generally, the compositions will contain from about 5% by weight of the binder based on the weight of the inorganic powder although larger amounts, such as to about 30% by weight, can be utilized in some applications. The binder may be present in an amount greater than 0.5% by weight based on the inorganic powder.

A variety of binders have been suggested and utilized in the prior art and can be utilized in the methods and compositions of the present invention. Examples these binders include starch, cellulose derivatives, polyvinyl alcohols, polyvinylbutyral, etc. Examples of synthetic resin binders include thermoplastic materials such as polystyrene, polyethylene, polypropylene and mixtures thereof.

Other binders which are useful in the composition of the invention include vegetable oils, petroleum jelly and various wax-type binders which may be hydrocarbon waxes or oxygen-containing hydrocarbon waxes. Examples of hydrocarbon waxes include petroleum waxes such as paraffin wax, microcrystalline wax, petrolatum, etc., synthetic hydrocarbons such as Fischer-Tropsch wax, low molecular weight polyethylene, etc. Examples of oxygen- containing waxes include higher fatty acids and esters and glycerides of the higher fatty acids with a higher alcohol, and oxygen-containing compounds obtained by air-oxidation of normal paraffin or isoparaffin such as alcohols, ketones, carboxylic acids, oxycarboxylic acids, keto carboxylic acids, esters, lactones, etc. The oxygen-containing wax-type binders may be natural waxes and/or synthetic waxes. The natural waxes include animal waxes such as bees wax, whale wax, China wax, wool wax; vegetable waxes such as candelilla wax, carnuba wax, Japan wax, sugarcane wax, etc.; and mineral waxes such as montan wax, ozokerite wax, lignite wax, etc. Examples of synthetic oxygen-containing wax-type binders include modified waxes such as montan wax derivatives, paraffin wax derivatives, microcrystalline wax derivatives, etc.; higher monohydric alcohols such as cetyl alcohol, stearyl alcohol, myristyl alcohol, lauryl alcohol, etc.; higher fatty acids such as capric acic, lauric acid, palmitic acid, stearic acid, etc. Mixtures of any of the above waxes also can be utilized as binders in the present invention.

Sintering Aids

"Sintering aids" may be organic or inorganic materials which improve the properties of the final sintered products. Examples of inorganic materials include the hydroxides, oxides or carbonates of alkali metals, alkaline earth metals, and the transition metals including, in particular, the rare earth elements. Specific examples of inorganic sintering aids include calcium oxide, magnesium oxide, calcium carbonate, magnesium carbonate, zinc oxide, zinc carbonate, yttrium oxide, yttrium carbonate, zirconium oxide, zirconium carbonate, lanthanum oxide, neodymium oxide, samarium oxide, etc.

In another embodiment, overbased and gelled overbased metal salts may be used as sintering aids. Overbased metal salts are characterized by metal content in excess of that which would be present according to stoichiometry of metal in the particular organic compound reacted with the metal. Typically, a metal salt is reacted with an acidic organic compound such as a carboxylic acid, sulfonic acid, phosphorus acid, phenol or mixtures thereof. An excess of metal is incorporated into the metal salt using an acidic material, typically carbon dioxide. Gelled overbased metal salts are prepared by treating an overbased metal salt with a conversion agent, usually an active hydrogen-containing compound. Conversion agents include lower aliphatic carboxylic acids or anhydrides, water, aliphatic alcohols, cycloaliphatic alcohols, aryl aliphatic alcohols, phenols, ketones, aldehydes, amines and the like. The overbased and gelled overbased metal salts are known and described in U.S. Pat. No. 3,492,231 issued to McMillen which is hereby incorporated by reference for its disclosure to overbased and gelled overbased metal salts and processes for making the same.

Small amounts of the sintering aids generally are sufficient to provide the desired improvement in strength, thermal conductivity and/or density of the sintered shapes, thus, amounts of from about 0.05%, preferably about 0.1% to about 10%, preferably to about 5%, by weight of the sintering aid, based on the weight of the inorganic powder, are sufficient.

Liquid Dispersing Medium

The compositions of the present invention also may contain, and generally do contain a liquid dispersing medium. It is an important aspect of this invention, however, that mixtures, dispersions and/or slurries prepared with the compositions of the present invention are homogeneous, substantially free of agglomerated inorganic powder particles, and stable. It also is preferred that the liquid dispersing medium is volatile under the conditions of drying or binder burnout prior to the early stages of sintering so that the medium does not interfere with the preparation of compacted inorganic shapes characterized by desirable densities and the absence of cracks and other defects. The medium can have components characterized by relatively low boiling points such as, for example, in the range of about 25° C. to about 120° C. to facilitate subsequent removal of a portion or substantially all of the medium from the compositions of the invention. Alternatively, the medium may contain components that have higher boiling points to protect against removal from such compositions upon standing or initial heating. There is no criticality in an upper boiling point limitation on these liquids except, as noted above, the liquids should be removable prior to the initial sintering process.

The liquid dispersing medium may be oxygenated or hydrocarbon in nature. Oxygenated solvents include alcohols, esters and ketones as well as ethoxylated versions of the same. The oxygenated solvent may also be water. Combinations are oxygenated solvents may also be useful in the present invention. Particularly useful combination of oxygenated solvents is the combination of water with alcohols. Alcohols include alcohols having less than 12 carbon atoms, especially lower alkanols, such as methanol, ethanol, propanol and butanol. Esters include carboxylic esters prepared from carboxylic acids having from 2 to 20 carbon atoms and alcohols having from 1 to about 22 carbon atoms. Examples of carboxylic esters include methylacetate, ethylacetate, and propylacetate. Ketones include methylethyl ketone, methylisobutyl ketone as well as keto alcohols such as diacetone alochol, hydroxy acetone, hydroxymethylpentanone and the like. Tetrahydrofuran may also be used as a liquid dispersing medium.

The oxygenated dispersing media include alkoxy alcohols which are characterized as having ether linkages and may be prepared by using alkylene oxides having from 2 to about 10 carbons atoms, such as ethylene oxide, propylene oxide and the like. Alkoxy alcohols are available commercially under trade names such as Cellosolve TM, Propasol TM, Carbitol ® solvents available from Union Carbide. Examples of these materials include ethylene glycol monoethyl, monopropyl, monobutyl or monohexyl ethers, propylene glycol monomethyl, monoethyl, monopropyl, monobutyl and monohexyl ethers and the like. Alkoxy alcohols also include polyoxyalkylene glycols such as Carbowax ® PEG 300, 600, 1000 and 1450 available from Union Carbide Corporation. Polyoxypropylene glycols are also useful, such as Nyax 425 and Nyax 1025 available from Union Carbide and PPG-1200 and PPG-2000 available from Dow Chemical. Polyoxyalkylene polyols such as "TRITON ®" available from Rohm & Haas Company, "CARBOWAX ®" and "TERGITOL ®" available from Union Carbide, "ALFONIC ®" available from Conoco Chemical Company and "NEODOL ®" available from Shell Chemical are useful as liquid dispersing media.

Alkyl, cycloalkyl and aryl hydrocarbons, as well as petroleum fractions may also be used as liquid media in this invention. Included within these types are benzene and alkylated benzenes, cycloalkanes and alkylated cycloalkanes, cycloalkenes and alkylated cycloalkenes such as found in the naphthene-based petroleum fraction, and the alkanes such as found in the paraffin-based petroleum fractions. Petroleum ether, naphthas, mineral oils, Stoddard Solvent, toluene, xylene, etc., and mixtures thereof are examples of economical sources of suitable liquid disperse medium.

The amount of liquid disperse medium utilized in the compositions of the present invention may vary over a wide range although it is generally desirable to prepare compositions containing a maximum amount of the inorganic powder and a minimum amount of the disperse medium. The amount of liquid disperse medium utilized in any particular combination can be readily determined by one skilled in the art will depend upon the nature of the inorganic powder, the type and amount of dispersant, and any other components present in the composition. The amount of liquid dispersed medium present is usually from as low as 1-2%, generally about 5%, preferably about 10%, more preferably about 15%, to about 40%, preferably about 35%, more preferably about 30% by weight based on the amount of inorganic powder (A).

Other Additives

Other materials may be added to the compositions of the present invention. For example, plasticizers may be added to the compositions to provide more workable compositions. Examples of plasticizers normally utilized in inorganic formulations include dioctyl phthalate, dibutyl phthalate, benzyl butyl phthalate and phosphate esters.

Preparation

The preparation of inorganic shapes utilizing the methods of the present invention generally involves mixing the inorganic powder with the polymer derived from a sulfo monomer. The mixture can be prepared either in the absence or presence of a volatile liquid dispersing medium. Any of the above-described components described above can be mixed with the inorganic powder and the polymer at this stage. The mixed composition then is blended in, for example, a ball-mill where additional components can be added and blended into the mixture as desired. The blended mixture can then be shaped in a mold, a still water press, or sheet mold. Alternatively, the blended mixture can be extrusion-or ejection-molded to form a green body, or the mixture can be prepared by casting the mixture on a tape. A green body may also be prepared by spray-drying, rotary evaporation, etc. Following the formation of the mixture into the desired shape, the shaped mass is subjected to elevated temperature treatment (sintering).

The heat treatment is a high-temperature treatment at which time the inorganic powders are sintered resulting in the formation of a shape having the desired properties including suitable densities. For powder metallurgy, the sintering generally occurs between about 260° C. to about 1000° C. For ceramic processes, the sintering occurs from about 600° C., preferably about 700° C. up to about 2100° C., typically to 1700° C. When the inorganic powders (A) are oxide powders, baking and sintering can be effected in the presence of air or oxygen. However, when the inorganic powders are non-oxide powders such as the nitrides and carbides, sintering is effected in a nonoxidizing atmosphere such as an atmosphere of hydrogen, argon or nitrogen gas.

In one embodiment, the shaped mass is heated to a temperature which is sufficient to remove volatile materials from the green body. That is, the body is heated to a temperature which is sufficient to vaporize and/or decompose organic materials from the body. This heating step, often referred to as drying or binder burn-out, takes place at moderately elevated temperatures, and is generally completed at a temperature below about 700° C.

Removal of organic materials is generally carried out under conditions which provide for the removal of the organic materials before the inorganic powders are subjected to sintering.

In another embodiment, the organic materials, including binder, may be removed by solvent extraction. The solvent extraction may also be super critical solvent extraction, i.e., at high temperature and pressure. Generally, the green body is heated to above the flow point of the binder and exposed to solvent vapor. The green body may also be submerged in a solvent bath. In one embodiment, the green body is exposed to solvent extraction and then undergoes drying (burn out) to remove the organic materials. The solvents useful for extraction include liquid dispersing media described above. Alcohols, alkanes, such as hexane, pentane, octane, etc., and aromatic fractions including toluene and xylene are particularly useful.

U.S. Pat. Nos. 4,961,913 and 4,197,118 describe solvent extraction processes for ceramics and are hereby incorporated by reference for that disclosure.

The polymers useful in the present invention at 1% to 2.5% by weight based on inorganic powder are effective at providing viscosity reduction in ferrite containing aqueous systems. The polymers are effective at 2% to 5% by weight for controlling viscosity for extrusion of a 50% alumina system in mineral oil. Aluminum and silicon nitride organic systems, with or without a binder, have improved dispersancy when containing the polymers of the present invention.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method of preparing sintered shapes, comprising the steps of:
   (1) forming a green body from a mixture comprising (A) at least one inorganic powder with (B) at least one polymer derived from (a) at least two sulfo monomers or (b) a combination of (i) at least one sulfo monomer and (ii) at least one comonomer selected from the group consisting of acrylic compounds; maleic acids, anhydrides or salts; vinyl lactams; vinyl pyrrolidones; and fumaric acids or salts, provided the mixture is substantially free of polysaccharides.
   (2) sintering the body.

2. The method of claim 1 wherein the sulfo monomer is selected from vinylalkyl sulfo monomer and vinylaryl sulfo monomer.

3. The method of claim 1, wherein the sulfo monomer is an acrylamidohydrocarbyl sulfo monomer.

4. The method of claim 1, wherein the sulfo monomer is 2-acrylamido-2-methylpropane sulfonic acid or at least one salt thereof.

5. The method of claim 1, wherein the sulfo monomer is represented by the formula

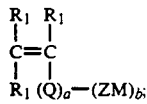 (I)

or mixtures thereof,
   wherein each $R_1$ is independently hydrogen or a hydrocarbyl group; a is 0 or 1; b is 1 or 2, provided that when a is 0, then b is 1;
   Q is a divalent or trivalent hydrocarbyl group or $C(X)NR_2Q'$;
   each $R_2$ is independently hydrogen or a hydrocarbyl group;
   Q' is a divalent or trivalent hydrocarbyl group;
   X is oxygen or sulfur;
   Z is $S(O)O$, or $S(O)_2O$; and
   M is hydrogen, a metal cation or ammonium cation.

6. The method of claim 5, wherein a and b are one; Q is $C(X)NR_2Q'$; X is oxygen; Q' is an alkylene group having 1 to about 18 carbon atoms; and Z is $SO_2O$.

7. The method of claim 1, wherein the polymer (B) contains a sulfo-ammonium salt which is derived from ammonia or an amine.

8. The method of claim 7, wherein the sulfo-ammonium salt is formed from an alkanolamine.

9. The method of claim 8, wherein the alkanolamine is diethylethanolamine or aminomethylpropanol.

10. The method of claim 1, wherein the polymer (B) contains a sulfo-metal salt wherein the metal of the metal salt is an alkali, alkaline earth or transition metal.

11. The method of claim 1, wherein the polymer (B) is an polymer of (i) the sulfo monomer and (ii) at least one comonomer selected from an acrylic acid, ester or salt; a methacrylic acid, ester or salt; an acrylamide; and a maleic acid, ester or anhydride.

12. The method of claim 1, wherein the comonomer (ii) is an acrylic acid, ester or salt.

13. The method of claim 1, wherein the interpolymer is prepared by polymerizing from about 10 mole percent to about 90 mole percent of the sulfo monomer (i) with from about 10 mole percent to about 90 mole percent of the comonomer (ii).

14. The method of claim 1, wherein the interpolymer is prepared by polymerizing from about 20 mole percent to about 75 mole percent of the sulfo monomer (i) with from about 25 mole percent to about 80 mole percent of the comonomer (ii).

15. The method of claim 1, wherein the polymer (B) is present in an amount from about 0.01% to about 30% by weight, based on the inorganic powder (A).

16. The method of claim 1, wherein the inorganic powder (A) is alumina or clay.

17. The process of claim 1, wherein the mixture of step (1) further comprises water.

18. The method of claim wherein step (2) further comprises removing volatile material from the shape.

19. A method for preparing sintered shapes, comprising the steps of:
   (1) forming a green body from a mixture comprising (A) at least one inorganic powder; (B) at least one polymer derived (i) from at least one acrylamidohydrocarbyl sulfo monomer and (ii) at least one comonomer selected from acrylic compounds, acrylonitriles, vinyl lactams, vinyl pyrrolidones and maleic acids, anhydrides or salts; and water, provided the mixture is substantially free of polysaccharide;
   (2) sintering the body.

20. The method of claim 19, wherein the sulfo monomer is 2-acrylamido-2-methylpropane sulfonic acid.

21. The method of claim 19, wherein the polymer (B) contains a sulfo-ammonium salt which is derived from ammonia, a monoamine or a polyamine.

22. The method of claim 21, wherein the sulfo-ammonium salt is derived from a hydroxyamine.

23. The method of claim 22, wherein the hydroxyamine is aminomethyl propanol.

24. The method of claim 19, wherein the polymer (B) is prepared by polymerizing from about 25 mole percent to about 75 mole percent of an acrylamido hydrocarbyl sulfo monomer (i), and from about 25 mole percent to about 75 mole percent of acrylic acid, ester or salt (ii).

25. The method of claim 19, wherein the inorganic powder (A) is a alumina or clay.

26. The process of claim 19, wherein step (2) further comprises removing volatile material from the shape.

27. An article, comprising:
a green body comprising a major amount of (A) at least one inorganic powder and (B) at least one polymer derived from (i) at least one sulfo monomer and (ii) at least one monomer selected from acrylic compounds, acrylonitriles, vinyl lactams, vinyl pyrolidones and maleic acids, anhydrides or salts.

28. The article of claim 27, wherein the sulfo monomer is an acrylamidohydrocarbyl sulfo monomer.

29. A sintered shape prepared by the method of claim 1.

* * * * *